(12) United States Patent
Grobbee

(10) Patent No.: US 11,858,083 B2
(45) Date of Patent: Jan. 2, 2024

(54) DENTAL BLANK POSITIONING DEVICE

(71) Applicant: Global Dental Science, LLC, Scottsdale, AZ (US)

(72) Inventor: Johannes Petrus Michael Grobbee, Tilburg (NL)

(73) Assignee: Global Dental Science, LLC, Scottsdale, AZ (US)

( * ) Notice: Subject to any disclaimer, the term of this patent is extended or adjusted under 35 U.S.C. 154(b) by 1048 days.

(21) Appl. No.: 15/918,697

(22) Filed: Mar. 12, 2018

(65) Prior Publication Data

US 2018/0257187 A1      Sep. 13, 2018

Related U.S. Application Data

(60) Provisional application No. 62/468,995, filed on Mar. 9, 2017.

(51) Int. Cl.
| | | |
|---|---|---|
| *B23Q 3/00* | (2006.01) | |
| *B23Q 3/06* | (2006.01) | |
| *B23C 3/13* | (2006.01) | |
| *A61C 13/00* | (2006.01) | |

(52) U.S. Cl.
CPC .......... *B23Q 3/062* (2013.01); *A61C 13/0022* (2013.01); *B23C 3/13* (2013.01); *B23Q 2703/10* (2013.01)

(58) Field of Classification Search
CPC .. B23Q 3/062; B23Q 3/00; B23Q 1/00; A61C 1/00; A61C 13/0022; A61C 13/00
See application file for complete search history.

(56) References Cited

U.S. PATENT DOCUMENTS

| | | | | |
|---|---|---|---|---|
| 5,647,743 A | * | 7/1997 | Schmitt .................... | A61C 7/00 433/22 |
| 6,059,568 A | * | 5/2000 | Munro ...................... | A61C 7/18 433/23 |
| 8,393,605 B2 | * | 3/2013 | Yang ........................ | B25B 5/003 269/287 |
| 2005/0147941 A1 | * | 7/2005 | McDonald ............... | A61C 5/85 433/153 |

(Continued)

FOREIGN PATENT DOCUMENTS

| | | |
|---|---|---|
| DE | 102006023673 | 11/2007 |
| EP | 1798459 | 6/2007 |

(Continued)

OTHER PUBLICATIONS

EP Application No. 18161215.1 European Search Report dated Jun. 5, 2018.

(Continued)

*Primary Examiner* — Lee D Wilson
(74) *Attorney, Agent, or Firm* — Harvey Law; Derrick W. Harvey

(57) ABSTRACT

A dental blank positioning device for positioning a dental blank holder within a manufacturing apparatus, the device capable of securing to a dental blank around its circumferential perimeter and comprising an interior side corresponding to the dental blank and an exterior side generally corresponding to a dental blank holder, an index element extending outwardly of the exterior side, whereby a portion of the index element may rest against an index chamber of a blank holder.

12 Claims, 5 Drawing Sheets

(56) References Cited

U.S. PATENT DOCUMENTS

| | | | |
|---|---|---|---|
| 2013/0101962 A1 | 4/2013 | Howe | |
| 2013/0216323 A1 | 8/2013 | Reck et al. | |
| 2014/0087327 A1* | 3/2014 | Noack | A61C 13/0022 433/50 |
| 2015/0064653 A1 | 3/2015 | Grobbee et al. | |
| 2016/0317263 A9 | 11/2016 | Morales et al. | |
| 2018/0257187 A1* | 9/2018 | Grobbee | B23Q 3/062 |
| 2019/0046305 A1* | 2/2019 | Gebhardt | A61C 13/0022 |
| 2019/0053881 A1 | 2/2019 | Grobbee et al. | |

FOREIGN PATENT DOCUMENTS

| | | |
|---|---|---|
| EP | 2403427 | 1/2012 |
| EP | 3216420 | 9/2017 |
| EP | 3284438 | 2/2018 |
| WO | WO2010094922 | 8/2010 |

OTHER PUBLICATIONS

U.S. Appl. No. 15/711,857; Restriction Requirement dated Nov. 29, 2018.
EP Application 18189345—EP Search Report dated Jan. 16, 2019.
EP Application 17192480—EP Search Report dated Apr. 11, 2018.

* cited by examiner

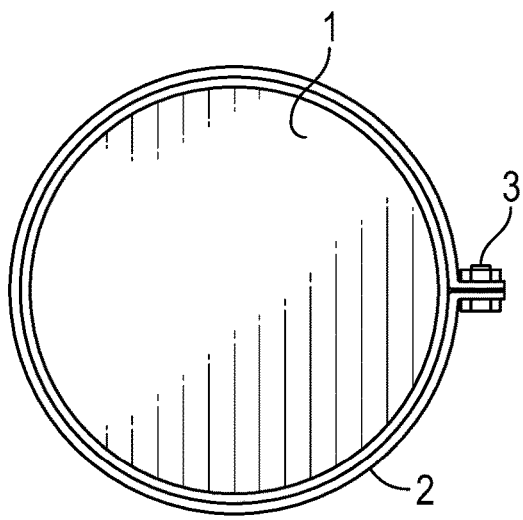
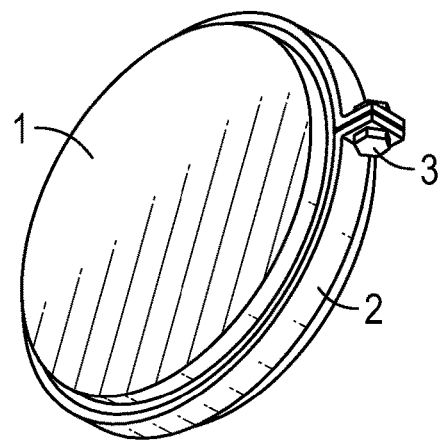
FIG. 1A FIG. 1B
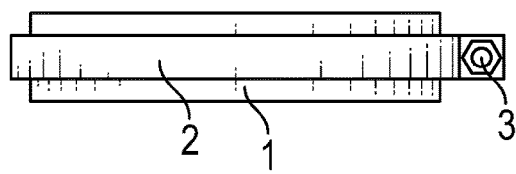
FIG. 1C
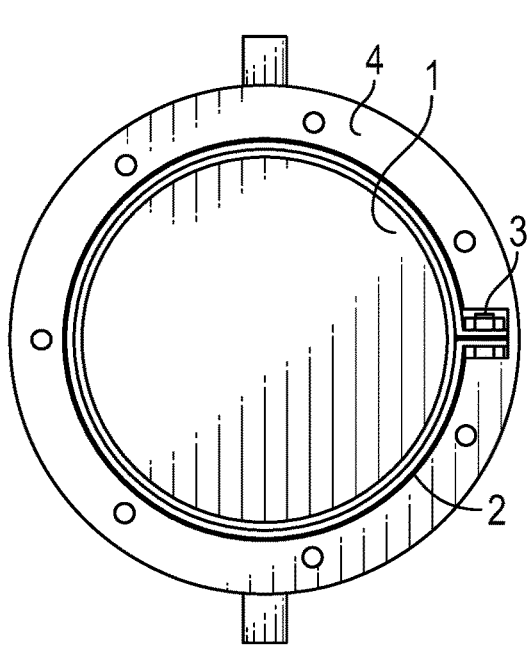
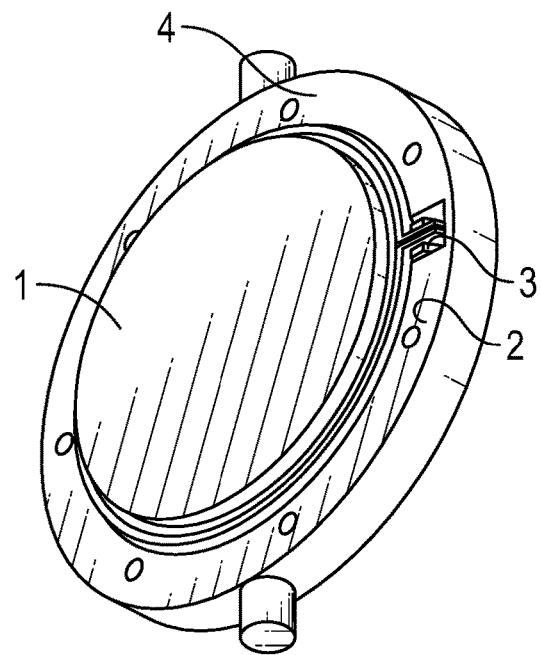
FIG. 2A FIG. 2B

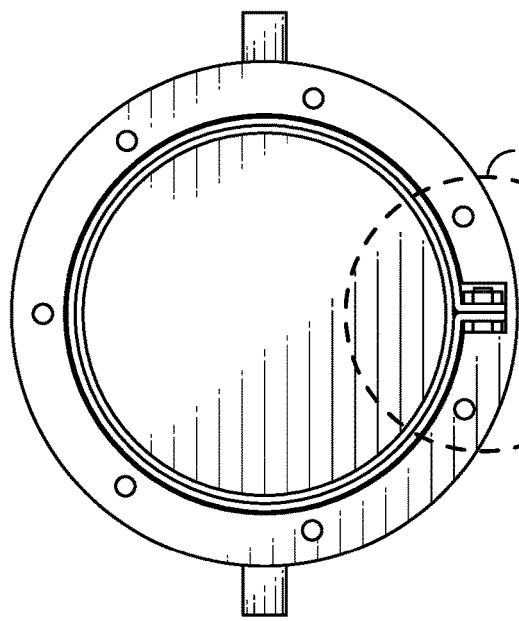 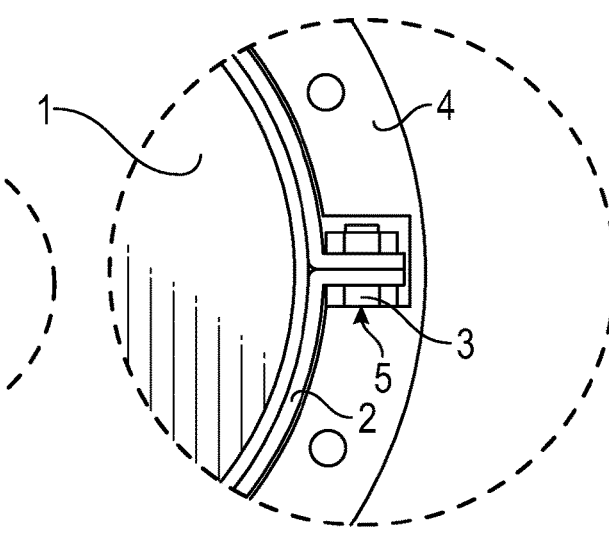
FIG. 3A   FIG. 3B
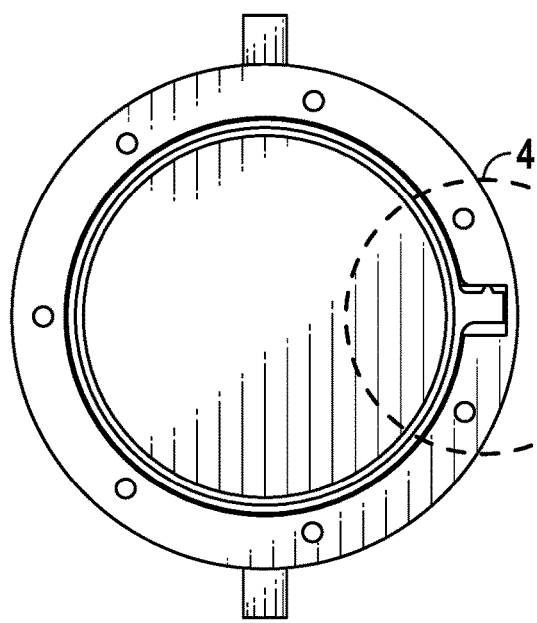 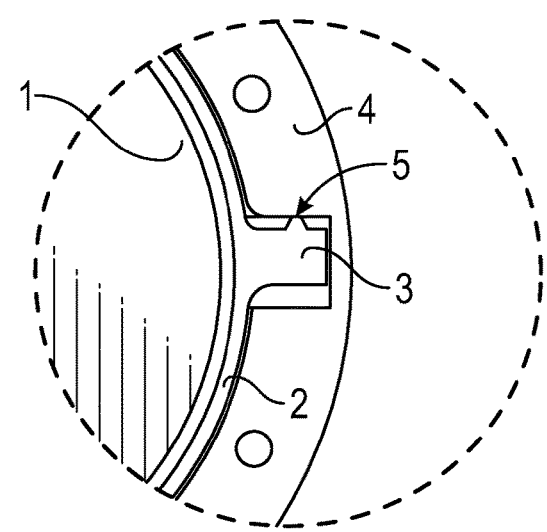
FIG. 4A   FIG. 4B

Section A-A

Section A-A

Section A-A

Section A-A

DENTAL BLANK POSITIONING DEVICE

RELATED APPLICATIONS

This application claims priority from U.S. Provisional Application No. 62/469,995 filed on Mar. 10, 2017 and entitled "Dental Blank Positioning Device," the entire contents of which are hereby fully incorporated herein.

FIELD OF INVENTION

The present invention relates to dental material blanks. More particularly, the present invention relates to positioning dental material blanks in a holder of a manufacturing apparatus in a stable and repeatable manner.

BACKGROUND OF THE INVENTION

In the field of Cad/Cam in dentistry and specifically known as digital dentistry, one difficulty faced by machine operators is the task of mounting a material blank (usually a puck-shaped material used for making a dental prosthesis) in a manufacturing apparatus like a milling machine. In certain cases the blank must be machined in multiple steps. In some new techniques, a dental prosthetic may include multiple layers of different materials, adding additional challenges to the accuracy of manufacturing the prosthetic from the material blank. In these circumstances, a maker of dental prosthetics must position the blank in the machine holder multiple times, creating opportunities to misalign the blank or otherwise create inaccuracies.

It is therefore an objective to create an accurate and repeatable position of the blank. It is further an objective to provide a simple tool that assists those manufacturing dental prosthetics to handle and position a material blank. It is a further objective to provide a solution that enables accurate manufacturing of a multiple layered dental prosthetic. It is even further an objective to enable repeatable, accurate management of positioning a material blank during the addition of layers of different materials.

SUMMARY OF THE INVENTION

In accordance with various aspects of the present invention, a first t embodiment may comprise a dental blank positioning device for positioning a dental blank holder within a manufacturing apparatus, the device capable of securing to a dental blank around its circumferential perimeter and comprising an interior side corresponding to the dental blank and an exterior side generally corresponding to a dental blank holder, an index element outwardly of the exterior side, whereby a portion of the index element may rest against an index chamber of a blank holder; the device further comprising two or more index elements; whereby the device may be secured to a dental blank through a clamping, shrink fit or glued around the dental blank; the device further comprising the index element extending from a blank positioning device, said index feature comprising a bolt and nut assembly, whereby at least a portion of the assembly is the index element and may seat within a chamber of the blank holder; the blank positioning device extending to a setting either above or below the blank holder, whereby the portion of the index element seats into the dental blank holder in a direction opposite of the blank positioning device extending to a setting; whereby the portion of the index element tapers from the blank positioning device to a terminal point of the index chamber.

In a second embodiment of the invention, a system for positioning dental blanks in a blank holder for a manufacturing apparatus is disclosed, the system comprising the dental blank positioning as claimed in the first embodiment, a dental blank holder, the holder comprising an index chamber capable of receiving at least a portion of the index element of the dental blank positioning device; whereby a position of the index element positions is congruent with the index chamber; the index element further comprising linear or curved portions; the index chamber further comprising linear or curved portions.

In a third embodiment of the invention, blank positioning device itself in the first embodiment or the system for positioning dental blanks in a blank holder for a manufacturing apparatus in the second embodiment may further comprise a dental material blank for use with the blank positioning device, the blank positioning device being adjacent to at least a portion of the material blank; further comprising a dental material blank for use with the blank positioning device, the blank positioning device mating within a groove of at least a portion of the material blank; further comprising a dental material blank for use with the blank positioning device, the blank positioning device mating to at least a portion of an outwardly protruding of the material blank.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 1a shows a top plan view, and FIG. 1b shows a perspective view, and FIG. 1c shows a side view of a Dental Blank 1 with a blank positioning device 2. The blank positioning device 2 has an index feature 3.

FIG. 2a shows a top plan view, and FIG. 2b shows a perspective view of the Dental Blank 1 with the Blank positioning device 2 with the index feature 3 positioned in the blank holder 4.

FIG. 3a shows a top plan view, and FIG. 3b shows a more detailed view of the same view of the index feature 3 positioned in the blank holder 4. The index feature 3 may be in contact with the holder 4 on the index position 5.

FIG. 4a shows a top plan view, and FIG. 4b shows a more detailed view of a different embodiment of index feature 3. In this embodiment the blank positioning device 2 may be shrink-fitted or glued around the dental blank 1. The index position 5 between the blank holder 4 and index feature 3 are examples of various possible shapes of an index feature 3 and blank holder 4.

FIG. 5a shows a top plan view of the inventive device. FIG. 5b depicts a side view of the inventive device. FIG. 5c shows a perspective view of the inventive device. FIG. 5d shows a cross section view of the view seen in FIG. 5b.

DETAILED DESCRIPTION OF EXEMPLARY EMBODIMENTS OF THE INVENTION

Figure 5A:
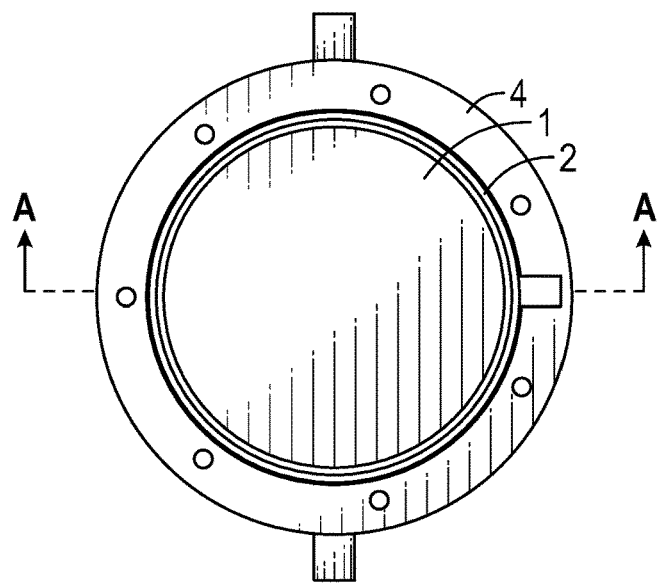
FIG. 5a-d shows multiple views of a different embodiment of index feature 3. In this example the index feature 3 consists of a pin that be received in a chamber in the blank holder 4 to create its unique index position.
Figure 5B:
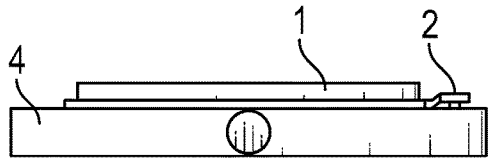
Figure 5C:
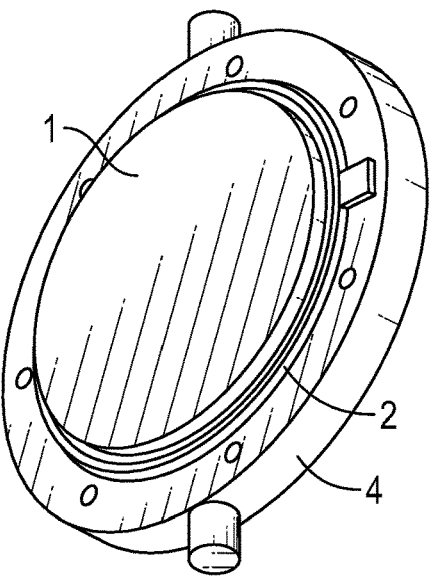
Figure 5D:
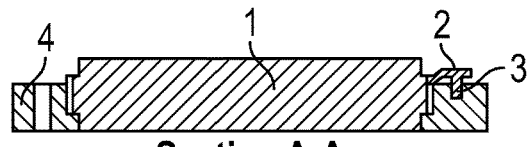

The present invention may be described herein in terms of various components. It should be appreciated that such components may be realized by any number of structural materials and components configured to perform the specified functions. For example, the present invention may be practiced in any number of dental contexts and the exemplary embodiments relating to positioning dental material blanks in a manufacturing apparatus are merely a few of the exemplary applications for the invention. For example, the principles, features and methods discussed may be applied to any crown and bridge restorative dentistry or prosthetic dentistry application.

In accordance with various aspects of the present invention, a generic dental blank Positioning device is provided to allow an easy, repeatable and accurate placement of a dental blank in a holder of a manufacturing apparatus. Dental blanks may be made in a unique shape for a certain manufacturing device or made in a generic universal shape (for instance, in approximately 98.5 mm diameter) and in various thicknesses. In the case a blank requires to be positioned multiple times in the holder of a manufacturing device, the blank may be designed or later modified with one or more notches or other geometrical features to have a unique position in the holder of the manufacturing device. The notches may mate with the holder directly or indirectly. To avoid unique combinations of blank and holder and to reduce the manufacturing costs of a blank, a generic blank positioning device is provided that may be used on all generically-shaped blank. Other material blanks, as exemplified in FIGS. 6c-f, may be incorporated with customized aspects as desired for other unexpected synergies in positioning the material blanks in blank holders.

In accordance with an exemplary embodiment, the blank positioning device may be made of a variety of materials commonly known in the industry like steel or plastics. Other materials known in the arts to interact without dental prosthetic materials are well within the scope of this invention.

For example, with reference to an exemplary embodiment illustrated in FIG. 1a, FIG. 1b and FIG. 1c, the blank positioning device 2 may be clamped around the dental blank by tightening the bold and nut 3. The bold and nut may serve at least two purposes: first to clamp the positioning device 2 around the blank 1 and second to create the index feature 3. Other clamping mechanisms or assemblies known in the arts to stabilize, grasp, or otherwise provide a handle to an object are well within the scope of the invention. As further explored in FIGS. 6c-f, other tools for handling grooved or rimmed objects may be available within the scope of this invention.

With reference to an exemplary embodiment illustrated in FIG. 2a and FIG. 2b, positioning device 2 may be clamped around the dental blank 1 and positioned in the holder 4. This position is further illustrated in FIG. 3a and FIG. 3b, with index feature 3 interacting with blank holder 4 at index position 5. According to inventive methods, the dental blank 1 with the mounted positioning device 2 may be removed from the holder 4 and placed back in the holder at a later stage at the same position. The unique index position 5 can be later located accurately by touching or seating the index feature 3 to the holder 4 at the index position 5. In other embodiments of the invention, the index feature may be held at a set distance or otherwise indirectly positioned at a set relationship from the index position rather than directly touching. In still other embodiments, the holder 4 may have multiple chambers for secondary securement/locking.

With reference to an exemplary embodiment illustrated in FIGS. 4a and 4b, the positioning device 2 may be secured about the blank 1 utilizing a shrink fit method and material. In other embodiments the positioning device 2 may be secured by use of a material-appropriate glue as understood in the arts, depending upon the type of material blank. An exemplary embodiment of index feature 3 as seen in FIG. 4b may create an index position 5 with the blank holder 4. The index feature or element 3 is shown as having an abutment element that extends towards an internal wall of a chamber of the blank holder 4, or the index receiving feature. In alternative designs, the abutment element may resemble any number of geometric configurations, having linear or curved portions.

For example, with reference to an exemplary embodiment illustrated in FIG. 5a through 5d, the index feature 3 may resemble a pin securing into a chamber in blank holder 4. In this embodiment, the positioning device 2 comprises an arm extending distally from the blank 1 so that it may be held above or supra the blank holder 4. Index feature or element 3 in this embodiment then extends downward from the positioning device 2 into a generally complementary chamber or index receiving feature of the blank holder 4, securing and recording the position of the blank for future reference and later modifications of the material blank that would benefit from consistent positioning. For instance, CAD CAM or other software that automates a milling process of the material blank for multiple layers of a dental prosthesis may be improved by the ability to begin with a set position of the material blank. In alternative embodiments within the scope of the invention, the positioning device, indexing element, and index receiving chamber may vary from that depicted in illustrations, having a scope that includes structures of alternative geometric and volumetric configurations having linear or curved portions that may seat downward or upward into a chamber of the holder 4.

Figure 6A:
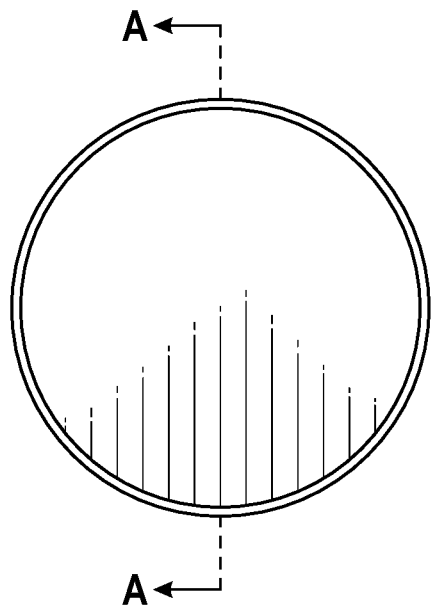
FIG. 6a-f shows top plan and cross sectional view of different embodiments of how the positioning device 2 may fit around the dental blank 1. An inventive embodiment of the positioning device is illustrated as flush to the material blank as seen in 6a and 6b, in a groove of the blank as in FIG. 6c and FIG. 6d or on a rim as in FIG. 6e and FIG. 6f.
Figure 6B:
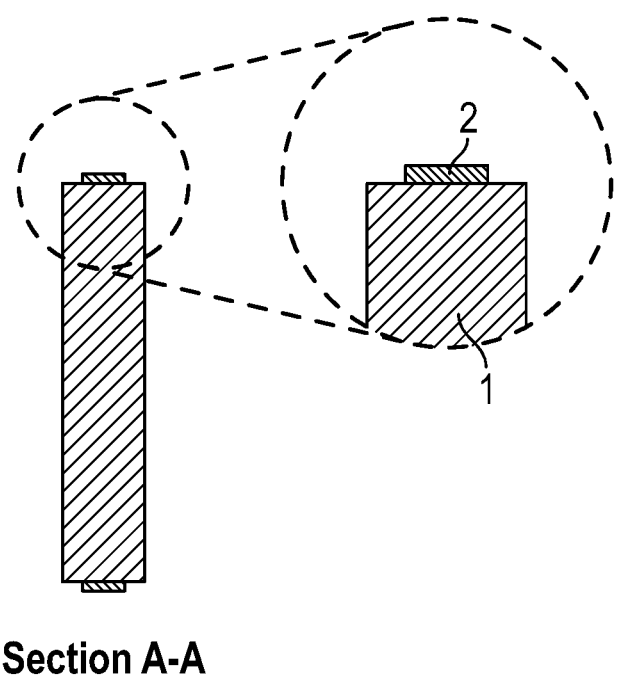
Figure 6C:
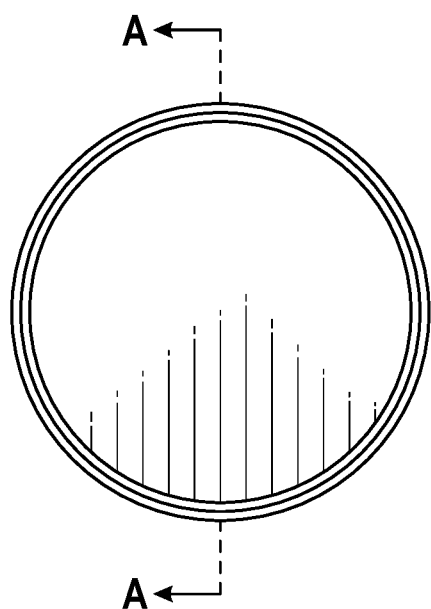
Figure 6D:
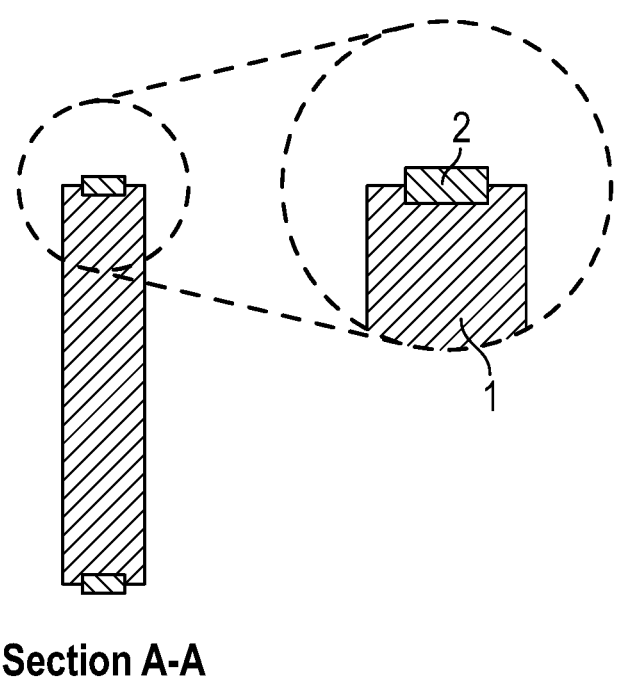
Figure 6E:
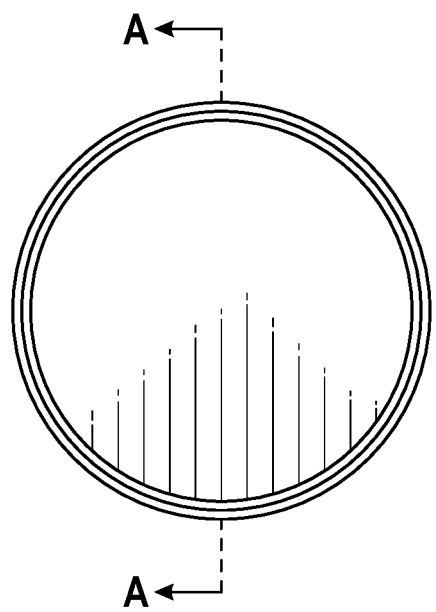
Figure 6F:
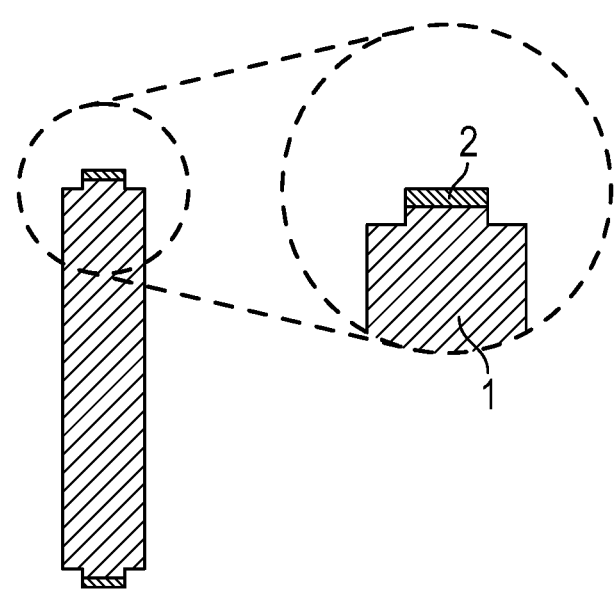

For example, with reference to an exemplary embodiment illustrated in FIGS. 6a-f as alternative embodiments of how the positioning device 2 may be positioned around the dental blank 1 are depicted. FIG. 6a-f illustrates different embodiments of how the positioning device 2 may fit about the dental blank 1. Positioning device 2 is shown as being flush to the material blank 1 as seen in 6a and 6b. The material blank 1 in this embodiment may meet the positioning device without modification, so standard shaped blanks are available for implementation in the inventive device and method of using thereof. In an alternative embodiment of the invention for the relationship of the positioning device to the material blank, FIGS. 6c-6d depict a material blank 1 that has been modified to include a groove into which the positioning device 2 may mate. Material blank 1 may be manufactured to have a groove or other concave indentation, or as part of an after-market modification. Other variations of this embodiment are within the scope of the invention, such as an indentation into the blank that includes any type of geometric shapes, including linear and curved, and complementary structures on the positioning device 2. In still another alternative embodiment of the invention regarding the relationship of the positioning device to the material blank, the material blank 1 may include an external element such as a rim as depicted in FIG. 6e and FIG. 6f. Material blank 1 may be manufactured to have an external element or it may have one added as part of an after-market modification. Other variations of this embodiment are within the scope of the invention, such as an external element that includes any type of geometric shapes including linear and curved, and complementary structures on the positioning device 2.

The positioning device 2 may be secured to the blank 1 by a bold and nut assembly, shrink fit, friction fit, glued, or other methods known in the arts to secure to a prosthetic material. Other methods of detachably affixing positioning device to blank, not illustrated, are within the scope of the invention. As illustrated in FIGS. 6c-f, the position to the blank may be in a notch, flush or on a rim of either the material blank, the positioning device, or a combination thereof.

The invention claimed is:

1. A system for positioning dental blanks in a manufacturing apparatus, the system comprising:
   a dental blank holder for positioning a dental blank in the manufacturing apparatus and comprising an index chamber and an internal perimeter; and
   a dental blank positioning device capable of being secured to a dental blank around a circumferential perimeter of the dental blank, the dental blank position device comprising:
      an interior side corresponding to the dental blank and an exterior side generally corresponding to the dental blank holder,
      an index element extending outwardly of the exterior side, whereby a portion of the index element rests against the index chamber within the internal perimeter of the dental blank holder, wherein the index chamber is capable of receiving at least a portion of the index element of the dental blank positioning device, and whereby at least a portion of the assembly seats within a said index chamber of the blank holder.

2. The system according to claim 1, wherein the dental blank positioning device comprises two or more index elements.

3. The system according to claim 1, whereby the dental blank positioning device is securable to the dental blank through a clamping, shrink fit or glued around the dental blank.

4. The system according to claim 1, wherein the dental blank positioning device, when placed in the blank holder, extends in a direction either above or below the blank holder, whereby a portion of the index element seats into the dental blank bolder in a direction opposite of the direction wherein the blank positioning device extends above or below the blank holder.

5. The system according to claim 4, whereby the portion of the index element tapers from the blank positioning device to a terminal point of the index chamber.

6. The system according to claim 1, whereby a position of the index element is congruent with the index chamber.

7. The system according to claim 1, wherein the index element further comprises linear or curved portions.

8. The system according to any one of claim 1, the index chamber further comprising linear or curved portions.

9. The system according to any one of claim 1, further comprising: a dental material blank for use with the blank positioning device, the blank positioning device being adjacent to at least a portion of the material blank.

10. The system according to claim 1, further comprising: a dental material blank for use with the blank positioning device, the blank positioning device mating within a groove of at least a portion of the dental material blank.

11. The system according to claim 1, further comprising: a dental material blank for use with the blank positioning device, the blank positioning device mating to at least a portion of an outward protrusion of the material blank.

12. The system according to claim 1, the index element comprising a bolt and nut assembly.

* * * * *